(12) United States Patent
Samples et al.

(10) Patent No.: US 8,354,481 B2
(45) Date of Patent: *Jan. 15, 2013

(54) METHOD OF CONTROLLING A POLYMERIZATION REACTOR

(75) Inventors: Paul K. Samples, Scott Depot, WV (US); John R. Parrish, Charleston, WV (US); Ivan J. Hartley, Victoria, TX (US); Jeffrey B. Drabish, Elkview, WV (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/316,136

(22) Filed: Dec. 9, 2011

(65) Prior Publication Data

US 2012/0136482 A1    May 31, 2012

Related U.S. Application Data

(62) Division of application No. 11/666,723, filed as application No. PCT/US2005/037339 on Oct. 18, 2005, now Pat. No. 8,093,341.

(60) Provisional application No. 60/622,755, filed on Oct. 28, 2004.

(51) Int. Cl.
*C08F 2/34* (2006.01)
*C08F 210/06* (2006.01)

(52) U.S. Cl. ............................ 526/59; 526/901; 700/269

(58) Field of Classification Search .................... 526/59, 526/60, 901; 700/269
See application file for complete search history.

(56) References Cited

U.S. PATENT DOCUMENTS

| 5,191,521 | A  | * | 3/1993 | Brosilow ........................ 700/40 |
| 6,846,884 | B2 | * | 1/2005 | Parrish et al. ................... 526/73 |
| 8,093,341 | B2 | * | 1/2012 | Parrish et al. ................... 526/59 |

FOREIGN PATENT DOCUMENTS

WO    WO 01/49751 A1 *  7/2001

* cited by examiner

*Primary Examiner* — Fred M Teskin

(57) ABSTRACT

The present invention provides methods of controlling a gas-phase polymerization process. The method includes determining a difference between a control variable of the polymerization process, such as the production rate, and the desired value of the control variable; adjusting or maintaining a first manipulated variable to at least partially compensate for the difference between the control variable and the desired value; and adjusting or maintaining a second manipulated variable to at least partially compensate for the effect of adjusting or maintaining the first manipulated variable. The first and second manipulated variables can include process variables such as the fluidized bed weight, the catalyst concentration, the concentration of one or more monomers, the flow of one or more comonomers, the ratio of one comonomer to another comonomer, the activator concentration, the ratio of an activator to selectivity control agent, the concentration of a chain transfer agent, and the retardant concentration.

20 Claims, 3 Drawing Sheets

Example 1 Production Control
Ethylene Partial Pressure and Bed Weight as Control Variables

Example 1 Production Control
Ethylene Partial Pressure and Bed Weight as Control Variables

Example 2 Production Control
Catalyst Feed and Ethylene Partial Pressure as Control Variables

Example 2 Production Control
Catalyst Feed and Ethylene Partial Pressure as Control Variables

METHOD OF CONTROLLING A POLYMERIZATION REACTOR

CROSS-REFERENCE TO RELATED APPLICATIONS

The present application is a divisional application of the U.S. application Ser. No. 11/666,723, filed on Apr. 30, 2007, now U.S. Pat. No. 8,093,341, issued on Jan. 10, 2012, entitled "METHOD OF CONTROLLING A POLYMERIZATION REACTOR," the teachings of which are incorporated by reference herein, as if reproduced in full hereinbelow, which is a 371 national phase application of International Patent Application No. PCT/US05/37338, filed on Oct. 18, 2005, which claims priority from the U.S. Provisional Application No. 60/622,755, filed on Oct. 28, 2004, the teachings of which are incorporated by reference herein, as if reproduced in full hereinbelow.

TECHNICAL FIELD

The invention relates to the control of gas-phase polymerization processes in the presence of a catalyst through the coordinated manipulation of selected process variables.

BACKGROUND ART

In a highly competitive market, olefin polymerization reaction systems are pushed ever closer to their operating constraints in order to increase production in existing equipment. Operating close to the constraints, the possibility of a reactor upset becomes greater. An upset is a reaction which deviates from normal operating constraints to a degree which requires a correction in production rate to prevent a significant economic loss by way of a shutdown, production of unusable product, loss of raw material, or the like. Thus, it is important to control upsets which would otherwise require a shutdown or other drastic or unusual operating action unless an effective amount of polymerization retarding agent is introduced imminently. Typically an upset could involve a significant increase in temperature in the reacting system, which may escalate the reaction further out of control and/or dangerously soften the product particles, causing them to stick together and form large unmanageable agglomerates. Unusual pressure values, superficial gas velocities, or static effects can also be harbingers of upsets, although not as common or always as dependable as temperatures. Upsets can also be the result of influences that are not measured or predicted, such as variations in reactant feed quality, irregular catalyst flow(s), and equipment malfunction. To maintain reactor operation and avoid expensive shutdowns, polymerization retarders can be fed into the reactor during or following an upset once it is detected, but manual intervention to introduce fast acting polymerization retardants may often not be timely enough or accurate enough to avoid the adverse consequences of major process upsets. Human monitoring cannot be expected to suffice where combinations of rapidly changing variables must be interpreted to anticipate runaway conditions.

One method for controlling reactors uses neural net based controllers. A neural network is an interconnected assembly of simple processing elements, units or nodes, whose functionality is loosely based on the animal neuron. The processing ability of the network is stored in the inter-unit connection strengths, or weights, obtained by a process of adaptation to, or learning from, a set of training patterns. In neutral net systems, a collection of process inputs and controllers are simultaneously used and controlled because of the nature of neural nets to achieve the improvement. Thus, when the controller is turned off, there is no effective control of resin properties, control of pressure, control of production rate, optimization of production rate. When the controller is activated, the multiple inputs and process variables are evaluated and the collective nature of these values results in a control effort. It would be desirable to provide a method that can control process variables without using a neural net approach.

DISCLOSURE OF INVENTION

Embodiments of the invention provide a method of controlling a gas-phase polymerization process that includes (a) continuously, periodically or intermittently determining a difference between an actual or estimated value of a control variable of the polymerization process and a desired value of the control variable of the polymerization process; (b) adjusting or maintaining at least a first manipulated variable to at least partially compensate for the difference between the actual or estimated value of control variable and the desired value; and (c) adjusting or maintaining a second manipulated variable to at least partially compensate for the effect of adjusting or maintaining the first manipulated variable. The first and second manipulated variables are selected from the group of process conditions consisting of a weight of fluidized bed, a catalyst concentration, a concentration of one or more monomers, a flow of one or more comonomers, a ratio of a first comonomer to a second comonomer, a first activator concentration, a ratio of a second activator to selectivity control agent, a concentration of a chain transfer agent, and a retardant concentration.

In particular embodiments, the control variable is the production rate. Some embodiments, where the production rate is the control variable, can control the production rate within an average of 10% of the desired production rate when measured over an 8 hour period. In some embodiments, the average production rate deviates from the desired production rate by less than 8%, preferably less than 5% of the desired production rate when the average is measured over an 8 hour period. In other embodiments, the control variable can be a resin property such as the molecular weight, the melt index, or molecular weight distribution of the resin.

In particular embodiments, the invention is a method of controlling the production rate of a polymerization process that includes (a) determining a desired value of the production rate; (b) continuously, periodically or intermittently monitoring the actual or estimated value of the production rate of the process; (c) continuously, periodically or intermittently comparing the actual or estimated value of the production rate to the desired value of the production rate; (d) adjusting or maintaining at least a first manipulated variable to at least partially compensate for the difference between the actual or estimated value of the production rate and the desired value; and (e) adjusting or maintaining a second manipulated variable to at least partially compensate for the effect of adjusting or maintaining the first manipulated variable, wherein the first and second manipulated variables are selected from the group of process conditions consisting of a weight of fluidized bed, a catalyst concentration, a concentration of one or more monomers, a flow of one or more comonomers, a ratio of a first monomer to a second monomer, an activator concentration, and a retardant concentration; and wherein an average production rate determined over at least about 8 hours is within about 10%, preferably within 8%, more preferably within 5% of the desired value of the production rate.

In other embodiments, the invention provides a method of controlling the production rate in a gas-phase polymerization process, wherein the method comprises (a) determining a desired value of the production rate; (b) continuously, periodically or intermittently monitoring the actual or estimated production rate; (c) continuously, periodically or intermittently determining a difference between the actual or estimated production rate and the desired value; (d) adjusting or maintaining at least a first manipulated variable within a range having an upper and a lower limit to at least partially compensate for the difference between the actual or estimated production rate and the desired value; and (e) continuously, periodically, or intermittently adjusting or maintaining the second manipulated variable within a range having an upper and a lower limit around a target value for the second manipulated variable to at least partially compensate for the effect of adjusting or maintaining the first manipulated variable and to at least partially compensate for a remaining difference between the actual or estimated production rate and the desired value; wherein the first and second manipulated variables are selected from the group of process conditions consisting of a weight of fluidized bed, a catalyst concentration, a concentration of one or more monomers, an activator concentration, and a retardant concentration with the proviso that when the first manipulated variable is the catalyst concentration, the second manipulated variable is selected from the group consisting of the weight of fluidized bed, the activator concentration, and the retardant concentration.

In some embodiments, the process provides for controlling one control variable of a polymerization reactor independently of controlling other polymerization conditions.

In some embodiments compensating for the effect of adjusting the first manipulated variable further includes compensating for at least a portion of a remaining difference between the actual or estimated value of the control variable and the desired value.

Some of the methods can also include establishing limits on the value of the first manipulated variable.

Some of the methods described of above include adjusting the second manipulated variable continuously, periodically, or intermittently or maintaining the second manipulated variable within a range having an upper and a lower limit bounding a target value for second manipulated variable. When such a range is employed, the upper and lower limits may differ in their relative distance from the target value. In other words, the absolute value of the difference between the upper limit and the target value is different than the absolute value between the lower limit and the target value. Thus, in some embodiments, one limit may be set to allow a relatively smaller deviation from the target value while the other limit allows a relatively larger deviation. Regardless of the various limits that may be chosen, the target value of the second manipulated variable can be adjusted at various times during the process. In some embodiments, the target value of the second manipulated variable is continuously updated or adjusted. In others it may be intermittently or periodically updated or adjusted.

Some embodiments of the process are not limited by the type of catalyst that may be used, but some processes of the invention are particularly well-suited to single site catalysts. In particular embodiments, the single site catalyst is metallocene catalyst. In other embodiments, a Ziegler-Natta catalyst may be used. Some embodiments can also be applied to processes using a chrome catalyst.

Particular combinations of first and second variables are also preferred in some embodiments. For example, in some preferred embodiments, the first or second manipulated variable is the fluidized bed weight. In some methods described herein, the first and second manipulated variables are the catalyst concentration and the fluidized bed weight. In other embodiments, the first and second manipulated variables are the activator concentration and the fluidized bed weight. In still other embodiments, the first and second manipulated variables are the concentration of one or more monomers and the fluidized bed weight. Yet other embodiments use the fluidized bed weight and the retardant concentration as the first and second manipulated variables. In some embodiments where the bed weight is manipulated, the bed weight is maintained within about 5% of a target bed weight. In other embodiments, the bed weight is maintained within 1%, 2%, 3%, or 4% of the target bed weight of the control process. The first and second manipulated variables may also be the catalyst concentration and the concentration of one or more monomers. In some particularly useful embodiments of the invention, the first and second manipulated variables are selected so that when the first manipulated variable is the catalyst concentration, the second manipulated variable is selected from the group consisting of the weight of fluidized bed, the activator concentration, and the retardant concentration.

Embodiments of the invention described above may account for the relative speed with which a change in a manipulated variable produces an effect on the first process condition. Typically, the variables are selected so that a change in the second manipulated variable affects the control variable relatively faster than a change in the first manipulated variable. But in some embodiments, the first manipulated variable may be slower acting than the second manipulated variable, or the manipulated variables can affect the first process condition in about the same amount of time.

The methods described above can be used in polymerization processes to prepare a variety of products. Some preferred methods are used in the processes that make an alpha-olefin homopolymer or interpolymer. Some methods are particularly suited to processes for preparing a polyethylene homopolymer or an interpolymer of ethylene with at least one comonomer selected from the group consisting of a $C_4$-$C_{20}$ linear, branched or cyclic diene, vinyl acetate, and a compound represented by the formula $H_2C=CHR$ wherein R is a $C_1$-$C_{20}$ linear, branched or cyclic alkyl group or a $C_6$-$C_{20}$ aryl group.

Other methods are particularly useful for processes for preparing a polypropylene homopolymer or an interpolymer of propylene with at least one comonomer selected from the group consisting of ethylene, a $C_4$-$C_{20}$ linear, branched or cyclic diene, and a compound represented by the formula $H_2C=CHR$ wherein R is a $C_1$-$C_{20}$ linear, branched or cyclic alkyl group or a $C_6$-$C_{20}$ aryl group. In one such method the second manipulated variable is the ratio of activator to selectivity control agent.

MODES FOR CARRYING OUT THE INVENTION

Figure 1:
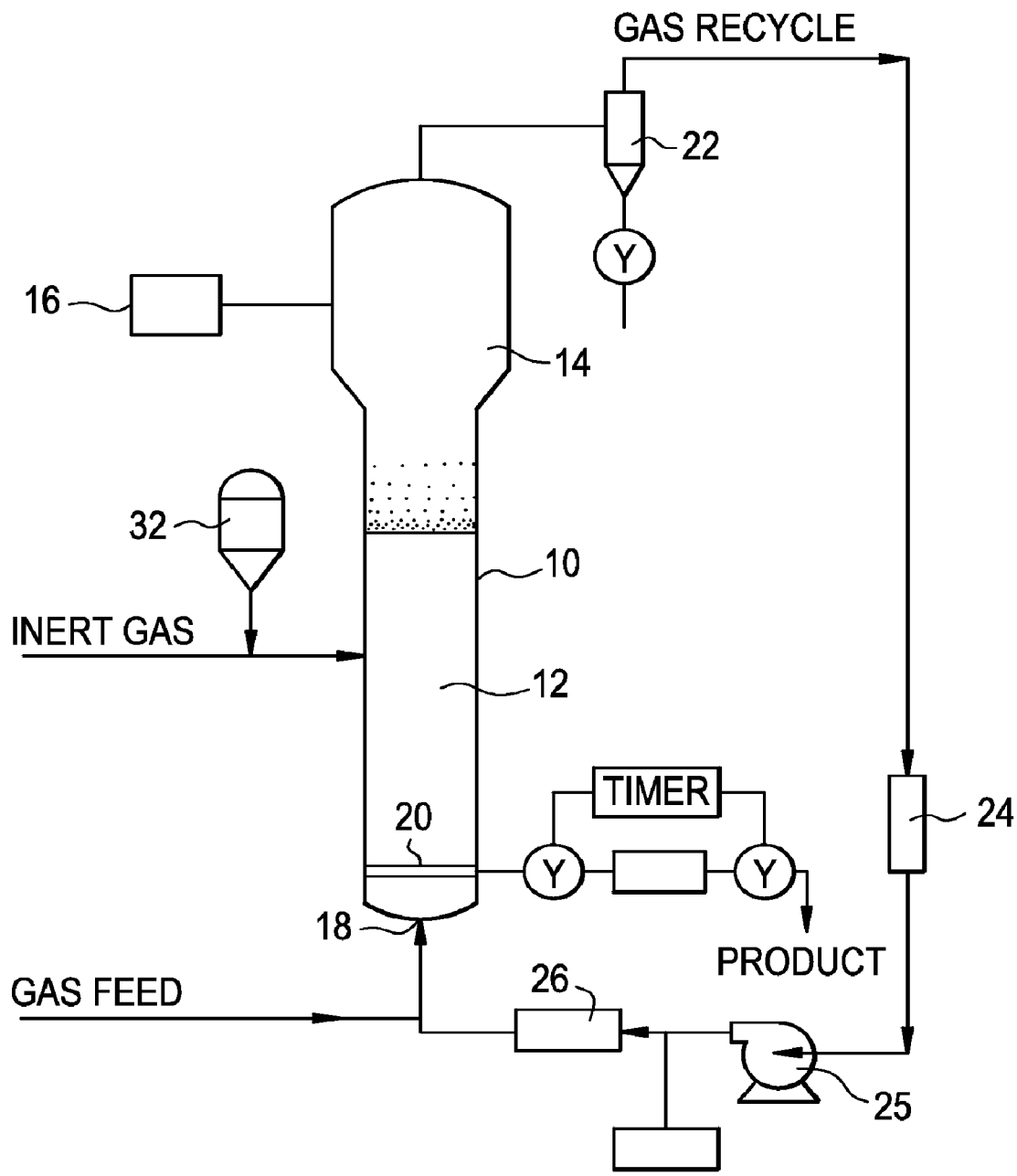
FIG. 1 illustrates a fluidized bed reaction system useful with embodiments of the inventive catalysts.

In the following description, all numbers disclosed herein are approximate values, regardless whether the word "about" or "approximately" is used in connection therewith. They may vary by up to 1%, 2%, 5%, or sometimes 10 to 20%. Whenever a numerical range with a lower limit, RL, and an upper limit RU, is disclosed, any number R falling within the range is specifically disclosed. In particular, the following numbers R within the range are specifically disclosed: R=RL+k*(RU−RL), where k is a variable ranging from 1% to 100% with a 1% increment, i.e. k is 1%, 2%, 3%, 4%, 5%, ..., 50%, 51%, 52%, ..., 95%, 96%, 97%, 98%, 99%, or 100%. Moreover, any numerical range defined by two numbers, R, as defined above is also specifically disclosed.

Described herein is a process for controlling the polymerization of one or more alpha-olefins in the gas phase in the presence of a catalyst. In a broad sense, embodiments of the invention provide a method that includes (a) continuously, periodically or intermittently determining a difference between an actual or estimated value of a control variable of the polymerization process and a desired value of the control variable of the polymerization process; (b) adjusting or maintaining at least a first manipulated variable to at least partially compensate for the difference between the actual or estimated value of control variable and the desired value; and (c) adjusting or maintaining a second manipulated variable to at least partially compensate for the effect of adjusting or maintaining the first manipulated variable. The first and second manipulated variables are selected from the group of process conditions consisting of a weight of fluidized bed, a catalyst concentration, a concentration of one or more monomers, a flow of one or more comonomers, a ratio of a first comonomer to a second comonomer, an activator concentration, a ratio of an activator to selectivity control agent, a concentration of a chain transfer agent, and a retardant concentration.

One method of controlling processes is a modular multivariable control system ("MMC"). A modular multivariable control system is an interconnection of one or more individual controllers, called coordinated controllers. One such system is described in U.S. Pat. No. 5,191,521, incorporated herein by reference in its entirety. Typically, each coordinated controller effects the control of one process variable in a process through any number of control efforts. Consequently, if there are, say, three process variables to be monitored and controlled in a process, there will be three interconnected coordinated controllers making up the MMC system which controls that process.

A process model is constructed for the coordinated control structure. The process model describes the influence that each adjustment or maintenance of a manipulated variable has upon the process (first) condition, and the time period elapsed before that influence is reflected in the process condition. This time period from when an adjustment or maintenance of a manipulated variable is changed until a resultant effect is exhibited in the control process condition is called the "dead time" for that adjustment or maintenance of a manipulated variable. Therefore the adjustment or maintenance of the second manipulated variable is effectively performed on the remaining difference between the actual or estimated value of the process condition and its desired value or condition, called its set point. Each adjustment or maintenance of a manipulated variable associated with a particular coordinated controller may, and ordinarily does, have a different respective dead time.

Filters are configured for each manipulated variable and are used to tune the controller response to process condition changes. Filters describe how or along what trajectory the process condition will progress toward its set point given a change in the process, such as that due to a disturbance or a change in the set point. Each filter has a tuning parameter corresponding to its respective adjustment or maintenance of a manipulated variable which determines the rate at which the process condition will progress toward this set point. These tuning parameters accommodate modeling errors by matching the speed of response of the process condition to the expected modeling error. Large modeling errors require the associated response to be tuned to be relatively slow to prevent unstable or oscillatory responses to a disturbance or set point change. Conversely, small modeling errors permit tuning the response to be relatively fast, thus allowing a quick response to system changes.

Each adjustment or maintenance of a manipulated variable which influences the process condition is given a ranking which indicates its long term ordering relative to the other adjustment or maintenance of manipulated variables. The lowest order long term, or primary, adjustment or maintenance of a manipulated variable is that adjustment or maintenance of a manipulated variable which assumes the long term load necessary to maintain the process condition at its set point. Contributions to the long term load are made by the higher order, secondary, long term adjustment or maintenance of manipulated variables only if the primary has saturated, i.e., reached its limit. The primary adjustment or maintenance of a manipulated variable is preferably one that is easily and inexpensively supplied relative to the other adjustment or maintenance of other manipulated variables.

Each adjustment or maintenance of a manipulated variable is also given a ranking which indicates its short term ordering relative to the other adjustment or maintenance of manipulated variables. The lowest order active adjustment or maintenance of a manipulated variable, or the first active adjustment or maintenance of a manipulated variable, is that which will respond towards the short term change, such as a change of set point or the entering of a disturbance, to drive the process condition to its set point. The higher order active adjustment or maintenance of manipulated variables, i.e., secondary active control, will be used to compensate for short term change only if the lower order active control (first active control) has saturated. In general, it is preferable to choose the first active control as the one that can force the process condition to respond most rapidly to set point changes and disturbances. Note, in some cases, it may be desirable to have two or more adjustment or maintenance of manipulated variables act simultaneously. In such a case these adjustment or maintenance of a manipulated variables would be given the same active order number.

In the case where no adjustment or maintenance of manipulated variables have saturated, a coordinated controller having "n" associated adjustment or maintenance of manipulated variables is capable of maintaining the process condition at its respective set point while keeping n−1 adjustment or maintenance of manipulated variables at their desired values (in accordance with mathematical convention, the letter "n" represents any whole number). In general, secondary and higher order long term adjustment or maintenance of manipulated variables are assigned desired nominal values at which they are maintained unless they are needed to suppress long term load disturbances or to achieve the desired set point. Each adjustment or maintenance of a manipulated variable further has a prescribed limit to which it can be adjusted from its nominal value. For example, if the adjustment or maintenance of a manipulated variable is a valve, the nominal value may correspond to a position where the valve is half open, and the limit would then correspond to that adjustment which would fully open or fully close the valve. Consequently, unless the primary adjustment or maintenance of a manipulated variable has been saturated, the secondary and higher order long term adjustment or maintenance of manipulated variables will be adjusted so as to reach their nominal values in the long term.

The first active control can be either the primary, secondary or higher order long term adjustment or maintenance of a manipulated variable. If it is the primary, then all other adjustment or maintenance of manipulated variables will be maintained at their nominal values. If the first active control is a secondary or higher order longer term control, when the first active control is adjusted to obtain the desired response for the process condition, the primary control will also be adjusted so that the first active adjustment or maintenance of a manipulated variable will eventually return to its desired nominal value.

By combining the respective influences of the individual adjustment or maintenance of manipulated variables, the process condition may be maintained at the chosen set point over both the short and long term irrespective of process disturbances. When a disturbance is detected in the process, such as through a decrease in the process condition, the first active adjustment or maintenance of a manipulated variable is adjusted to compensate for that decrease. The progressively higher priority active adjustment or maintenance of manipulated variables are also adjusted to compensate for the decrease only as lower order active adjustment or maintenance of manipulated variables become saturated. Concurrent with the adjustment of any lower order active adjustment or maintenance of a manipulated variable, the primary adjustment or maintenance of a manipulated variable is adjusted to compensate for the disturbance in the long term regardless of the short term adjustments made to the other adjustment or maintenance of manipulated variables. As time progresses and the primary adjustment or maintenance of a manipulated variable begins to exhibit its influence on the process condition, the lower order active adjustment or maintenance of manipulated variables initially used to compensate for the disturbance are returned to their nominal values.

The production rate, or other variable can be continuously, periodically or intermittently monitored. Typically, the monitoring is accomplished by a numerical model to give a cumulative or instantaneous approximation of the value of the control variable in the process. In other embodiments, the value of the control variable can be measured directly. But in some embodiments, it is preferable to monitor the control variable based on an instantaneous measure of its value. Methods for determining instantaneous values of process variables such as production rate are known in the art. Regardless, of how it is determined, the value of the control variable is compared to the desired value of the control variable. The value of the control variable can be essentially continuously compared to the desired value. But typically, the comparison is made at regular intervals at a predetermined periodicity. In other embodiments, the value is compared to the target range intermittently based typically on other process condition indicators that may signal the possibility of a deviation of the control variable from its desired value. The desired production rate in pounds per hour typically ranges from about 3,000 to about 250,000 pounds per hour, and is preferably in the range of about 8,000 to about 140,000 pounds per hour. This range is proportional to the size of reactors thus, larger reactor are capable of higher productions rates.

Once the desired resin production rate is determined, the actual production rate is observed as the polymerization progresses. One way of detecting the actual production rate is accomplished by detecting changes in the exotherm of the reaction and calculating a production rate based on these changes. When the value of the control variable is not at the desired value, a process variable is adjusted or maintained. A first process variable is adjusted or maintained to at least partially compensate for the difference between the value of the control variable and its desired value. In addition, a second process variable is adjusted or maintained. The second variable is adjusted or maintained to account for the effect that a change to the first variable has on the reaction system and in some embodiments to compensate for at least a part of the remaining difference between the value of the control variable and the desired value of the control variable. Process variables that are adjusted in an effort to move the control variable toward its desired value are referred to as manipulated variables.

Selection of pairs of first and second manipulated variables is made by models that predict the effects of such changes in process variables, disturbances, or set point changes will have on the control variable. The models have a tuning parameter corresponding to its respective control effort for each of the manipulated variables which determines the rate at which the process variable will progress toward this set point. These tuning parameters accommodate modeling errors by matching the speed of response of the process variable to the expected modeling error. Large modeling errors require the associated response to be tuned to be relatively slow to prevent unstable or oscillatory responses to a disturbance or set point change. Conversely, small modeling errors permit tuning the response to be relatively fast, thus allowing a quick response to system changes. In some embodiments, the first manipulated variable is selected to have a relatively slower impact on the control variable. The second variable is typically selected to act over a relatively longer time scale. However, methods where the first variable is faster acting or acts on relatively the same time scale as the second variable are also possible.

The relative time-scale of a response due to a change in a manipulated variable depends on a number of factors. One factor is the so-called "dead time," which is the time period from when a control action is taken until a resultant effect is exhibited in the value of the control variable. Each control action associated with a particular coordinated controller may, and ordinarily does, have a different respective dead time. For control actions influencing a multiplicity of process variables, each will have a different model and a different dead time for each process variable influenced. For example, an increase in catalyst concentration or flow will result in an increase in the production rate. However, the time it takes for the change in concentration or flow is influenced by the time constant for the catalyst. A typical time constant might be on the order of 100 minutes in addition to the time it takes to establish a meaningful concentration change. On the other hand an increase to the concentration, or flow, of a monomer such as ethylene in an ethylene polymerization may produce an increase in the production rate in about 10 to 15 minutes.

Typically, limits are set on the value the manipulated variable may take before corrective action is taken. Such limits around the desired value of the manipulated variable can include distinct upper and lower limits that differ in their relative distance from the desired value. In other words, the absolute value of the difference between the upper limit and the desired value of the manipulated variable is different than the absolute value between the lower limit and the manipulated variable. Thus, in some embodiments, one limit may be set to allow a relatively smaller deviation from the target value while the other limit allows a relatively larger deviation. Such limits are useful when a deviation in one direction from the desired value has a more critical effect on the process than a deviation in the other direction. Regardless, of the various limits that may be chosen, the desired value of the manipulated variable can be adjusted at various times during the process. In some embodiments, the desired value of the manipulated variable is continuously updated or adjusted. In others it may be intermittently or periodically updated or adjusted.

Typical manipulated variables include process conditions such as the weight or level of the fluidized catalyst bed, the catalyst concentration, a concentration of one or more monomers, the flow of one or more monomers, the ratio of one first monomer to a second monomer, the activator concentration, the ratio of the activator to selectivity control agent, the concentration of a chain transfer agent, and retardant concentration. In one specific embodiment, the manipulated variables are any combination of these process conditions with the proviso that in a Ziegler-Natta process, embodiments other than those employing catalyst concentration as the first variable and the concentration of one or monomers as the second monomer are preferred. In one specific embodiment, the method of controlling a control variable of a polymerization reactor is independent of controlling other polymerization conditions in a gas-phase polymerization process.

In some methods the first and second manipulated variables are the catalyst concentration and the fluidized bed weight. In other embodiments, the first and second manipulated variables are the activator concentration and the fluidized bed weight. In still other embodiments, the first and second manipulated variables are the concentration of one or more monomers and the fluidized bed weight. Yet other embodiments, use the fluidized bed weight and the retardant concentration as the first and second manipulated variables. The first and second manipulated variables may also be the catalyst concentration and the concentration of one or more monomers. In some particularly useful embodiments of the invention, the first and second manipulated variables are selected so that when the first manipulated variable is the catalyst concentration, the second manipulated variable is selected from the group consisting of the weight of fluidized bed, the activator concentration, and the retardant concentration. In one specific embodiment, the process is a metallocene-catalyzed polymerization wherein the first and second manipulated variables are selected such that when the one variable is the catalyst concentration, the other manipulated variable is selected from the group consisting of the weight of fluidized bed, the activator concentration, and the retardant concentration.

In some processes, manipulating the bed weight of the catalyst bed is particularly useful in directing the value of the control variable when coordinately adjusted along with another process condition. In some embodiments, the reactor bed weight operating point is set and the weight of the bed is allowed to vary as the models dictate, but is constrained to a value within 1%, 2%, 5%, 8%, or 10% weight percent of the operating point. In some embodiments where the bed weight is controlled, the concentration of ethylene or propylene is also controlled. Typically ethylene concentration is measured as its partial pressure. When propylene is used, the effect of liquid monomer in the reactor should also be accounted for. In certain embodiments, the concentration of a monomer, particularly ethylene is maintained within about 50%, 35%, 25%, 20%, 10%, or about 5% of a target value. In one preferred embodiment, the bed weight is increased and the ethylene concentration is reduced when the production rate exceeds the upper limit on the production rate target range.

As mentioned above, some embodiments use changes in the concentration or amount of catalyst fed to the reactor to influence a control value, such as the production rate. An increase in catalyst feed will increase production rate and conversely a decrease in catalyst feed will decrease production rate. By quantifying the manner in which the catalyst affects the production rate, the amount of catalyst needed to bring the actual production rate into line with the desired production rate is determined. In commercial processes, the catalyst can be fed into the reactor in a range of about 0 to about 250 pounds per hour, and is preferably fed in a range of about 0 to about 100 pounds per hour. This range is adjusted to reflect the productivity of the catalyst and prevent the overfeeding of catalyst to the reactor. The catalyst fed into the reactor can, for short periods of time, be zero to compensate for a much higher than desired production rate.

In some embodiments, the manipulated variables are coordinatively adjusted or maintained in a manner designed to move the value of the control variable within 1%, 2%, 5%, 8%, or 10% of the desired value of the control variable. Some control schemes can control the production rate to within 1% or less of the selected production rate value on average when measured over an entire production run, typically 8 hours. Other control schemes can control the production rate to within 2%, 5%, 8% or 10% of the selected production rate. Such averages should be determined on typical reactor runs over at least about an 8 hour period of operation. In particular methods where the first and second variables are the bed weight and the monomer flow, the production rate at any given point in the process does not exceed the target production rate by more than about 25%. Other embodiments, may be able to control the process to a greater or lesser extent.

Examples of polymers that can be produced using the processes described herein include homopolymers and copolymers (including elastomers) of an alpha-olefin such as ethylene, propylene, 1-butene, 3-methyl-1-butene, 4-methyl-1-pentene, 3-methyl-1-pentene, 1-heptene, 1-hexene, 1-octene, 1-decene, and 1-dodecene as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene as typically represented by ethylene-butadiene copolymer and ethylene-ethylidene norbornene copolymer; and polyolefins (including elastomers) such as copolymers of two or more alpha-olefins with a conjugated or non-conjugated diene as typically represented by ethylene-propylene-butadiene copolymer, ethylene-propylene-dicyclopentadiene copolymer, ethylene-propylene-1,5-hexadiene copolymer, and ethylene-propylene-ethylidene norbonene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer; styrenic copolymers (including elastomers) such as polystyrene, ABS, acrylonitrile-styrene copolymer, α-methylstyrene-styrene copolymer; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6, 6, and nylon 12; thermoplastic polyesters such as polyethylene terephthalate and polybutylene terephthalate; polycarbonate, polyphenylene oxide, and the like. These resins may be used either alone or in combinations of two or more.

In particular embodiments, preferred polyolefins include polypropylene, polyethylene, and copolymers thereof and blends thereof, as well as ethylene-propylene-diene terpolymers. In some embodiments, preferred olefinic polymers include homogeneous polymers described in U.S. Pat. No. 3,645,992 by Elston; high density polyethylene (HDPE) as described in U.S. Pat. No. 4,076,698 to Anderson; heterogeneously branched linear low density polyethylene (LLDPE); heterogeneously branched ultra low linear density (ULDPE); homogeneously branched, linear ethylene/alpha-olefin copolymers; homogeneously branched, substantially linear ethylene/alpha-olefin polymers which can be prepared, for example, by a process disclosed in U.S. Pat. Nos. 5,272,236 and 5,278,272, the disclosures of which are incorporated herein by reference; and high pressure, free radical polymerized ethylene polymers and copolymers such as low density polyethylene (LDPE), ethylene-acrylic acid (EAA) and ethylene-methacrylic acid copolymers such as for example those available under the tradenames Primacor™ Nucrel™, and Escor™ and described in U.S. Pat. Nos. 4,599,392, 4,988,781, and 5,384,373, each of which is incorporated herein by reference in its entirety, and ethylene-vinyl acetate (EVA) copolymers. Polymer compositions described in U.S. Pat. Nos. 6,538,070, 6,566,446, 5,869,575, 6,448,341, 5,677,383, 6,316,549, 6,111,023, or 5,844,045, each of which is incorporated herein by reference in its entirety, are also suitable in some embodiments. Of course, blends of polymers can be used as well. In some embodiments the blends include two different Ziegler-Natta polymers. In other embodiments, the blends can include blends of a Ziegler-Natta and a metallocene polymer. In still other embodiments, the thermoplastic resin used herein is a blend of two different metallocene polymers.

In some particular embodiments, the thermoplastic resin is a propylene-based copolymer or interpolymer. In some embodiments, the process can be particularly well applied to propylene-based polymers such as for example those described in U.S. Pat. No. 5,504,172, U.S. Pat. No. 6,525,157 and WO 00/01745.

Any catalyst which is capable of copolymerizing one or more olefin monomers to make an interpolymer or homopolymer may be used in embodiments of the invention. For certain embodiments, additional selection criteria, such as molecular weight capability and/or comonomer incorporation capability, preferably should be satisfied. It should be understood that the term "catalyst" as used herein refers to a metal-containing compound which is used, along with an activating cocatalyst, to form a catalyst system. The catalyst, as used herein, is usually catalytically inactive in the absence of a cocatalyst or other activating technique. However, not all suitable catalyst are catalytically inactive without a cocatalyst and thus may not require activation.

Suitable catalysts include, but are not limited to, single-site catalysts (both metallocene catalysts and constrained geometry catalysts), multi-site catalysts (Ziegler-Natta catalysts), and variations therefrom. They include any known and presently unknown catalysts for olefin polymerization. Ziegler-Natta-based processes typically also employ a Lewis acid as a catalyst activator. Some suitable Lewis acids follow the formula $R_gMX_{3-g}$ wherein R is R' or OR' or $NR'_2$ wherein R' is a substituted or unsubstituted aliphatic or aromatic hydrocarbyl group containing 1 to 14 carbon atoms, X is selected from the group consisting of Cl, Br, I, and mixtures thereof, and g ranges from 0-3, and M is aluminum or boron. Exemplary Lewis acids include tri-n-hexyl aluminum, triethyl aluminum, diethyl aluminum chloride, trimethyl aluminum, dimethyl aluminum chloride, methyl aluminum dichloride, triisobutyl aluminum, tri-n-butyl aluminum, diiosbutyl aluminum chloride, isobutyl aluminum dichloride, $(C_2H_5)AlCl_2$, $(C_2H_5O)AlCl_2$, $(C_6H_5)AlCl_2$, $(C_6H_5O)AlCl_2$, $(C_6H_{13}O)AlCl_2$, and combinations thereof. Exemplary boron-containing Lewis acids include $B Cl_3$, $BBr_3$, $B(C_2H_5)Cl_2$, $B(OC_2H_5)Cl_2$, $B(OC_2H_5)_2Cl$, $B(C_6H_5)Cl_2$, $B(OC_6H_5)Cl_2$, $B(OC_6H_{13})Cl_2$, $B(OC_6H_{13})Cl_2$, and $B(OC_6H_5)_2Cl$, and combinations thereof.

While any cocatalyst may be used, some suitable cocatalysts herein follow the formula $AlX'_d(R'')_cH_e$ wherein X' is Cl or OR''', R'' and R''' are individually $C_1$ to $C_{14}$ saturated hydrocarbon radicals, d is 0 to 1.5, e is 0 or 1; and c+d+e=3. Exemplary cocatalysts include $Al(CH_3)_3$, $Al(C_2H_5)_3$, $Al(C_2H_5)_2Cl$, $Al(i-C_4H_9)_3$, $Al(C_2H_5)_{1.5}Cl_{1.5}$, $Al(i-C_4H_9)_2H$, $Al(C_6H_{13})_3$, $Al(C_8H_{17})_3$, $Al(C_2H_5)_2H$, $Al(C_2H_5)_2(OC_2H_5)$, and combinations thereof.

In some embodiments, a single site catalyst, such as a metallocene catalyst, is used in the polymerization process. Single-site or metallocene type catalysts often produce polymers that have unique characteristics that are particularly useful in certain embodiments of the invention described herein. One suitable class of catalysts is the constrained geometry catalysts disclosed in U.S. Pat. Nos. 5,064,802, 5,132,380, 5,703,187, 6,034,021, EP 0 468 651, EP 0 514 828, WO 93/19104, and WO 95/00526, all of which are incorporated by references herein in their entirety. Another suitable class of catalysts is the metallocene catalysts disclosed in U.S. Pat. Nos. 5,044,438; 5,057,475; 5,096,867; and 5,324,800, all of which are incorporated by reference herein in their entirety. It is noted that constrained geometry catalysts may be considered as metallocene catalysts, and both are sometimes referred to in the art as single-site catalysts.

According to some embodiments of the invention, the process includes contacting ethylene and/or propylene and optionally one or more comonomers with a catalyst in a suitable polymerization diluent. In one embodiment, a chiral metallocene compound, e.g., a bis(cyclopentadienyl) metal compound as described in U.S. Pat. No. 5,198,401, and an activator are used. U.S. Pat. No. 5,391,629 also describes catalysts useful to produce the some copolymers suitable in dispersions described herein. Gas phase polymerization processes are described in U.S. Pat. Nos. 4,543,399, 4,588,790, 5,028,670, for example. Methods of supporting metallocene catalysts useful for making some copolymers used in embodiments of the invention are described in U.S. Pat. Nos. 4,808,561, 4,897,455, 4,937,301, 4,937,217, 4,912,075, 5,008,228, 5,086,025, 5,147,949, and 5,238,892. Numerous examples of the biscyclopentadienyl metallocenes described above for the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614. Descriptions of ionic catalysts for coordination polymerization including metallocene cations activated by non-coordinating anions appear in the early work in EP-A-0 277 003, EP-A-0 277 004, U.S. Pat. Nos. 5,198,401 and 5,278,119, and WO 92/00333. The use of ionizing ionic compounds not containing an active proton but capable of producing both the active metallocene cation and a non-coordinating anion is also known. See, EP-A-0 426 637, EP-A-0 573 403 and U.S. Pat. No. 5,387,568, EP-A-0 427 697 and EP-A-0 520 732. Ionic catalysts for addition polymerization can also be prepared by oxidation of the metal centers of transition metal compounds by anionic precursors containing metallic oxidizing groups along with the anion groups; see EP-A-0 495 375.

Another suitable class of catalysts is substituted indenyl containing metal complexes as disclosed in U.S. Pat. No. 5,965,756 and No. 6,015,868 which are incorporated by reference herein in their entirety. Other catalysts are disclosed in copending applications: U.S. Pat. Nos. 6,268,444 and 6,515,155 and U.S. Provisional Application Ser. No. 60/215,456; No. 60/170,175, and No. 60/393,862. The disclosures of all of the preceding patent applications are incorporated by reference herein in their entirety. These catalysts tend to have a higher molecular weight capability. Other catalysts, cocatalysts, catalyst systems, and activating techniques which may be used in the practice of the invention disclosed herein may include those disclosed in WO 96/23010, published on Aug. 1, 1996, the entire disclosure of which is hereby incorporated by reference; those disclosed in WO 99/14250, published Mar. 25, 1999, the entire disclosure of which is hereby incorporated by reference; those disclosed in WO 98/41529, published Sep. 24, 1998, the entire disclosure of which is hereby incorporated by reference; those disclosed in WO 97/42241, published Nov. 13, 1997, the entire disclosure of which is hereby incorporated by reference; those disclosed by Scollard, et al., in J. Am. Chem. Soc 1996, 118, 10008-10009, the entire disclosure of which is hereby incorporated by reference; those disclosed in EP 0 468 537 B1, published Nov. 13, 1996, the entire disclosure of which is hereby incorporated by reference; those disclosed in WO 97/22635, published Jun. 26, 1997, the entire disclosure of which is hereby incorporated by reference; those disclosed in EP 0 949 278 A2, published Oct. 13, 1999, the entire disclosure of which is hereby incorporated by reference; those disclosed in EP 0 949 279 A2, published Oct. 13, 1999, the entire disclosure of which is hereby incorporated by reference; those disclosed in EP 1 063 244 A2, published Dec. 27, 2000, the entire disclosure of which is hereby incorporated by reference; those disclosed in U.S. Pat. No. 5,408,017, the entire disclosure of which is hereby incorporated by reference; those disclosed in U.S. Pat. No. 5,767,208, the entire disclosure of which is hereby incorporated by reference; those disclosed in U.S. Pat. No. 5,907,021, the entire disclosure of which is hereby incorporated by reference; those disclosed in WO 88/05792, published Aug. 11, 1988, the entire disclosure of which is hereby incorporated by reference; those disclosed in WO88/05793, published Aug. 11, 1988, the entire disclosure of which is hereby incorporated by reference; those disclosed in WO 93/25590, published Dec. 23, 1993, the entire disclosure of which is hereby incorporated by reference; those disclosed in U.S. Pat. No. 5,599,761, the entire disclosure of which is hereby incorporated by reference; those disclosed in U.S. Pat. No. 5,218,071, the entire disclosure of which is hereby incorporated by reference; those disclosed in WO 90/07526, published Jul. 12, 1990, the entire disclosure of which is hereby incorporated by reference; those disclosed in U.S. Pat. No. 5,972,822, the entire disclosure of which is hereby incorporated by reference; those disclosed in U.S. Pat. No. 6,074,977, the entire disclosure of which is hereby incorporated by reference; those disclosed in U.S. Pat. No. 6,013,819, the entire disclosure of which is hereby incorporated by reference; those disclosed in U.S. Pat. No. 5,296,433, the entire disclosure of which is hereby incorporated by reference; those disclosed in U.S. Pat. No. 4,874,880, the entire disclosure of which is hereby incorporated by reference; those disclosed in U.S. Pat. No. 5,198,401, the entire disclosure of which is hereby incorporated by reference; those disclosed in U.S. Pat. No. 5,621,127, the entire disclosure of which is hereby incorporated by reference; those disclosed in U.S. Pat. No. 5,703,257, the entire disclosure of which is hereby incorporated by reference; those disclosed in U.S. Pat. No. 5,728,855, the entire disclosure of which is hereby incorporated by reference; those disclosed in U.S. Pat. No. 5,731,253, the entire disclosure of which is hereby incorporated by reference; those disclosed in U.S. Pat. No. 5,710,224, the entire disclosure of which is hereby incorporated by reference; those disclosed in U.S. Pat. No. 5,883,204, the entire disclosure of which is hereby incorporated by reference; those disclosed in U.S. Pat. No. 5,504,049, the entire disclosure of which is hereby incorporated by reference; those disclosed in U.S. Pat. No. 5,962,714, the entire disclosure of which is hereby incorporated by reference; those disclosed in U.S. Pat. No. 5,965,677, the entire disclosure of which is hereby incorporated by reference; those disclosed in U.S. Pat. No. 5,427,991, the entire disclosure of which is hereby incorporated by reference; those disclosed in WO 93/21238, published Oct. 28, 1993, the entire disclosure of which is hereby incorporated by reference; those disclosed in WO 94/03506, published Feb. 17, 1994, the entire disclosure of which is hereby incorporated by reference; those disclosed in WO 93/21242, published Oct. 28, 1993, the entire disclosure of which is hereby incorporated by reference; those disclosed in WO 94/00500, published Jan. 6, 1994, the entire disclosure of which is hereby incorporated by reference; those disclosed in WO 96/00244, published Jan. 4, 1996, the entire disclosure of which is hereby incorporated by reference; those disclosed in WO 98/50392, published Nov. 12, 1998, the entire disclosure of which is hereby incorporated by reference; those disclosed in Wang, et al., Organometallics 1998, 17, 3149-3151, the entire disclosure of which is hereby incorporated by reference; those disclosed in Younkin, et al., Science 2000, 287, 460-462, the entire disclosure of which is hereby incorporated by reference; those disclosed by Chen and Marks, Chem. Rev. 2000, 100, 1391-1434, the entire disclosure of which is hereby incorporated by reference; those disclosed by Alt and Koppl, Chem. Rev. 2000, 100, 1205-1221, the entire disclosure of which is hereby incorporated by reference; those disclosed by Resconi, et al., Chem. Rev. 2000, 100, 1253-1345, the entire disclosure of which is hereby incorporated by reference; those disclosed by Ittel, et al., ChemRev. 2000, 100, 1169-1203, the entire disclosure of which is hereby incorporated by reference; those disclosed by Coates, Chem. Rev., 2000, 100, 1223-1251, the entire disclosure of which is hereby incorporated by reference; and those disclosed in WO 96/13530, published May 9, 1996, the entire disclosure of which is hereby incorporated by reference. Also useful are those catalysts, cocatalysts, and catalyst systems disclosed in U.S. Ser. No. 09/230,185, filed Jan. 15, 1999; U.S. Pat. No. 5,965,756; U.S. Pat. No. 6,150,297; U.S. Ser. No. 09/715,380, filed Nov. 17, 2000. Methods for preparing the aforementioned catalysts are described, for example, in U.S. Pat. No. 6,015,868.

Some processes for olefin polymers such as polypropylene homopolymers or propylene-based interpolymers employ a selectivity control agent (SCA) and are described in U.S. Pat. No. 5,093,415, No. 6,511,935 and WO2002096957, each of which is incorporated herein by reference in its entirety. Typical SCAs are external electron donor compounds that can be used separately or partially or totally complexed with an activator, preferably an organoaluminum compound such as those described above. Many selectivity control agents are known in the art to produce active catalysts. Illustrative suitable selectivity control agents include electron donors such as tetrahydrofuran and aromatic esters such as ethyl benzoate or ethyl p-toluate, aromatic esters or organosilanes such as alkylakoxysilanes and arylalkoxysilanes. Particularly suitable silicon compounds of the invention contain at least one silicon-oxygen-carbon linkage.

Regardless of the catalyst or activator, the polymerization is carried out in the gas phase. It is preferably effected in a fluidized bed reactor or a stirred-tank reactor. Fluid bed reaction systems are discussed in detail in U.S. Pat. Nos. 4,302,565 and 4,379,759 which are incorporated herein by reference in their entirety. However for convenience, FIG. 1 illustrates an exemplary fluid bed reactor system which can be used in embodiments of the invention. The reactor 10 consists of a reaction zone 12 and a velocity reduction zone 14. The reaction zone 12 comprises a bed of growing polymer particles, formed polymer particles and a minor amount of catalyst particles fluidized by the continuous flow of polymerizable and modifying gaseous components in the form of make-up feed and recycle gas through the reaction zone. The mass gas flow rate through the bed is sufficient for fluidization. Gmf is used in the accepted form as the abbreviation for the minimum mass gas flow required to achieve fluidization, C.Y. Wen and Y. H. Yu, "Mechanics of Fluidization," Chemical Engineering Progress Symposium Series, Vol. 62, p. 100-111 (1966). In some embodiments the mass gas flow rate is 1.5, 3, 5, 7 or 10 times Gmf. The bed is prepared to avoid the formation of localized "hot spots" and to entrap and distribute the particulate catalyst throughout the reaction zone. On start up, the reaction zone is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The partially or completely activated precursor compound (the catalyst) used in the fluidized bed is preferably stored for service in a reservoir 32 under a blanket of a gas which is inert to the stored material, such as nitrogen or argon.

Fluidization is achieved by a high rate of gas recycle to and through the bed, typically in the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross sectional area. It is thus dependent on the geometry of the reactor.

Make-up gas is generally fed to the bed at a rate equal to the rate at which particulate polymer product is withdrawn. The composition of the make-up gas is determined by a gas analyzer 16 positioned above the bed. The gas analyzer determines the composition of the gas being recycled and the composition of the make-up gas is adjusted accordingly to maintain an essentially steady state gaseous composition within the reaction zone.

To insure proper fluidization, the recycle gas and where desired, part of the make-up gas are returned to the reactor at point 18 below the bed. There exists a gas distribution plate 20 above the point of return to aid fluidizing the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed. Particle return may be aided by a cyclone 22 which may be part of the recycle line. Where desired, the recycle gas may then be passed through a preliminary heat exchanger 24 designed to cool small entrained particles to prevent sticking in the downstream heat exchanger 26.

The recycle gas is compressed in a compressor 25 and then passed through a heat exchanger 26 where it is stripped of heat of reaction before it is returned to the bed. By constantly removing heat of reaction, no noticeable temperature gradient appears to exist within the upper portion of the bed. A temperature gradient exists in the bottom of the bed in a layer of about 6 to 12 inches, between the temperature of the inlet gas and the temperature of the remainder of the bed. Thus, it has been observed that the bed acts to adjust the temperature of the recycle gas above this bottom layer of the bed zone to make it conform to the temperature of the remainder of the bed thereby maintaining itself at an essentially constant temperature under steady state conditions. The recycle is then returned to the reactor at its base 18 and to the fluidized bed through distribution plate 20. The compressor 25 can also be placed upstream of the heat exchanger 26.

The fluidized bed contains growing and formed particulate polymer particles as well as catalyst particles. As the polymer particles are hot and possible active, they must be prevented from settling, for if a quiescent mass is allowed to exist, any active catalyst contained therein may continue to react and cause fusion. Recycle gas is diffused through the bed at a rate sufficient to maintain fluidization at the base of the bed. The distribution plate 20 serves this purpose and may be a screen, slotted plate, perforated plate, a plate of the bubble cap type and the like. The elements of the plate may all be stationary, or the plate may be of the mobile type disclosed in U.S. Pat. No. 2,298,792. Whatever its design, it should diffuse the recycle gas through the particles at the base of the bed to keep them in a fluidized condition, and also serve to support a quiescent bed of resin particles when the reactor is not in operation. The mobile elements of the plate may be used to dislodge any polymer particles entrapped in or on the plate.

Hydrogen may be used as a chain transfer agent in the polymerization reaction. The ratio of hydrogen/ethylene employed varies between about 0 to about 2.0 moles of hydrogen per mole of the ethylene in the gas stream.

The gaseous feed streams of alpha-olefin(s), and hydrogen (optional) are preferably fed to the reactor recycle line as well as liquid alpha-olefins and the cocatalyst solution. Optionally, the liquid cocatalyst can be fed directly to the fluidized bed. The partially activated or completely activated catalyst precursor is preferably injected into the fluidized bed as a solid or a mineral oil slurry. In the case of partial activation, an activator can be added to the reactor. The product composition can be varied by changing the molar ratios of the comonomers introduced into the fluidized bed. The product is continuously discharged in granular or particulate form from the reactor as the bed level builds up with polymerization. The production rate is controlled in part by adjusting the catalyst feed rate.

The hydrogen/alpha-olefin molar ratio can be adjusted to control average molecular weights. In the case of a copolymer of ethylene, the alpha-olefins (other than ethylene) can be present in a total amount of up to 15 percent by weight of the copolymer and, if used, are preferably included in the copolymer in a total amount of about 0.3 to about 15 percent by weight based on the weight of the copolymer.

The residence time of the mixture of reactants including gaseous and liquid reactants, catalyst, and resin in the fluidized bed can be in the range of about 1 to about 12 hours and is preferably in the range of about 2 to about 5 hours.

The total pressure in the fluidized bed reactor can be in the range of about 100 to about 600 psi (pounds per square inch), and is preferably in the range of about 200 to about 450 psi. Partial pressure of the primary alpha-olefin is set according to the amount of polymer desired. The balance of the total pressure is provided by alpha-olefins other than the primary alpha-olefin and/or inert gases such as nitrogen and inert hydrocarbons. The temperature in the reactors can be in the range of about 10 to about 130 degrees C., and is preferably in the range of about 50 to about 120 degrees C.

The reactor is run in the continuous mode in which granular polymer is typically withdrawn in 600 to 5000 pound shots while the polymerization is in progress. In the continuous mode, the product discharge system is enabled after the bed weight typically builds to 40,000 to 180,000 pounds, and the rate of discharge is altered to maintain constant bed weight.

As mentioned above, stirred tank reactors are also suitable in some embodiments of the invention. One such reactor is a two-phase (gas/solid) stirred bed, back mixed reactor. Some reactors are designed with a set of four "plows" mounted horizontally on a central shaft. Preferably the shafts rotate at about 200 revolutions per minute (rpm) to keep the particles in the reactor mechanically fluidized. The cylinder swept by these plows has a gas volume that is larger than the mechanically fluidizable volume. A disengager vessel is mounted atop the vertical cylinder on the reactor. This vessel typically more than doubles the gas volume of the reactor. Gas is continually recirculated through both the reactor and disengager via a blower so that the gas composition is homogeneous throughout.

Monomers and hydrogen (for molecular weight control) are fed to the reactor continuously via control valves. Partial pressures of monomer typically range between about 25 to about 400 psi. Comonomer (if any) content in the polymer is controlled by adjusting feed rates to maintain a constant comonomer/monomer molar ratio in the gas phase. Gas composition is measured at 1 to 6 minute intervals by a gas chromatograph analyzer. Molecular weight of the polymer can be controlled by adjusting hydrogen (optional) feed rate to maintain a constant mole ratio of hydrogen to monomer in the gas phase. Nitrogen makes up the balance of the composition of the gas, entering with the catalyst and leaving via a small vent of the reactor gases. Vent opening is adjusted via computer to maintain constant total pressure in the reactor.

The reactor is cooled by an external jacket of chilled glycol. The bed temperature is measured with an RTD temperature probe in a thermowell protruding into the bed at a 60 degree angle below horizontal, between the inner set of plows. Reactor temperature can be controlled to values in the range of about 10 to about 110 degrees C. Catalyst precursor can be fed either dry or as a slurry. Dry catalyst precursor is metered in shots into a 0.5 to 1 pound per hour nitrogen stream and is fed to the reactor via a 1/8 inch tube. Slurry catalyst precursor is metered in shots into a continuous stream of either isopentane or cocatalyst/isopentane solution in a 1/8 inch tube and this mixture is co-fed to the reactor with a 0.5 to 1 pound per hour nitrogen stream, which keeps polymer from forming in the injection tube. In either case, the catalyst is injected into the bed at an angle of approximately 45 degrees below vertical into the central zone between the front and rear plows.

The reactor is run in the continuous mode in which granular polymer is typically withdrawn in 0.4 pound shots while the polymerization is in progress. In the continuous mode, the product discharge system is enabled after the bed weight typically builds to 15 to 25 pounds, and the rate of discharge is altered to maintain constant bed weight.

A typical run in either reactor commences with monomers being charged to the reactor and feeds adjusted until the desired gas composition is reached. An initial charge of cocatalyst is added prior to starting catalyst feeding in order to scavenge any poisons present in the reactor. After catalyst feed starts, monomers are added to the reactor sufficient to maintain gas concentrations and ratios. Cocatalyst feed rate is maintained in proportion to the catalyst feed rate. A start-up bed may be used to facilitate stirring and dispersal of catalyst during the initial part of the operation. After the desired batch weight is made, the reactor is immediately vented, and monomers are purged from the resin with nitrogen. The batch is then discharged into a box, open to the atmosphere, unless other catalyst deactivation measures are specified. For multi-component operation, e.g., in situ blending, the desired fraction of resin is prepared under the initial reaction conditions, the conditions are changed to the conditions appropriate for the following stage of polymerization, and reaction is continued.

Conventional additives may also be introduced to the resins produced by embodiments of the invention. Some conventional additives include, for example, antioxidants, ultraviolet absorbing compositions, anti-static agents, pigments, dyes, nucleating agents, fillers, slip agents, fire retardants, plasticizers, smoke inhibitors, viscosity control agents, crosslinking agents and catalysts, tackifiers, and anti-blocking agents. Aside from fillers, the additives are typically present in the polymer resin in amounts of about 0.1 to about 10 parts by weight of the additive for each 100 parts by weight of the resin. Fillers typically are added in amounts of about 200 parts by weight or more per 100 parts by weight of resin.

Many useful fabricated articles can be made from polymer resins made by the processes described herein. For example, molding operations can be used to form useful fabricated articles or parts from the compositions disclosed herein, including various injection molding processes (e.g., that described in Modern Plastics Encyclopedia/89, Mid October 1988 Issue, Volume 65, Number 11, pp. 264-268, "Introduction to Injection Molding" by H. Randall Parker and on pp. 270-271, "Injection Molding Thermoplastics" by Michael W. Green, the disclosures of which are incorporated herein by reference) and blow molding processes (e.g., that described in Modern Plastics Encyclopedia/89, Mid October 1988 Issue, Volume 65, Number 11, pp. 217-218, "Extrusion-Blow Molding" by Christopher Irwin, the disclosure of which is incorporated herein by reference), profile extrusion, calandering, pultrusion (e.g., pipes) and the like. Rotomolded articles can also benefit from processes described herein. Rotomolding techniques are well known to those skilled in the art and include, for example, those described in Modern Plastics Encyclopedia/89, Mid October 1988 Issue, Volume 65, Number 11, pp. 296-301, "Rotational Molding" by R. L. Fair, the disclosure of which is incorporated herein by reference).

Fibers (e.g., staple fibers, melt blown fibers or spunbonded fibers (using, e.g., systems as disclosed in U.S. Pat. Nos. 4,340,563, 4,663,220, 4,668,566, or 4,322,027, all of which are incorporated herein by reference), and gel spun fibers (e.g., the system disclosed in U.S. Pat. No. 4,413,110, incorporated herein by reference), both woven and nonwoven fabrics (e.g., spunlaced fabrics disclosed in U.S. Pat. No. 3,485,706, incorporated herein by reference) or structures made from such fibers (including, e.g., blends of these fibers with other fibers, e.g., PET or cotton) can also be made from compositions prepared by the embodiments of the processes disclosed herein.

Film and film structures can also be made from compositions prepared by the processes described herein by using conventional hot blown film fabrication techniques or other biaxial orientation processes such as tenter frames or double bubble processes. Conventional hot blown film processes are described, for example, in The Encyclopedia of Chemical Technology, Kirk-Othmer, Third Edition, John Wiley & Sons, New York, 1981, Vol. 16, pp. 416-417 and Vol. 18, pp. 191-192, the disclosures of which are incorporated herein by reference. Biaxial orientation film manufacturing process such as described in a "double bubble" process as in U.S. Pat. No. 3,456,044 (Pahlke), and the processes described in U.S. Pat. No. 4,352,849 (Mueller), U.S. Pat. No. 4,597,920 (Golike), U.S. Pat. No. 4,820,557 (Warren), U.S. Pat. No. 4,837,084 (Warren), U.S. Pat. No. 4,865,902 (Golike et al.), U.S. Pat. No. 4,927,708 (Herran et al.), U.S. Pat. No. 4,952,451 (Mueller), U.S. Pat. No. 4,963,419 (Lustig et al.), and U.S. Pat. No. 5,059,481 (Lustig et al.), the disclosures of each of which are incorporated herein by reference, can also be used to make film structures. The film structures can also be made as described in a tenter-frame technique, such as that used for oriented polypropylene.

Other multi-layer film manufacturing techniques for food packaging applications are described in Packaging Foods With Plastics, by Wilmer A. Jenkins and James P. Harrington (1991), pp. 19-27, and in "Coextrusion Basics" by Thomas I. Butler, Film Extrusion Manual Process, Materials, Properties pp. 31-80 (published by TAPPI Press (1992)) the disclosures of which are incorporated herein by reference.

The films may be monolayer or multilayer films. Film can also be coextruded with the other layer(s) or the film can be laminated onto another layer(s) in a secondary operation, such as that described in Packaging Foods With Plastics, by Wilmer A. Jenkins and James P. Harrington (1991) or that described in "Coextrusion For Barrier Packaging" by W. J. Schrenk and C. R. Finch, Society of Plastics Engineers RETEC Proceedings, Jun. 15-17 (1981), pp. 211-229, the disclosure of which is incorporated herein by reference. If a monolayer film is produced via tubular film (i.e., blown film techniques) or flat die (i.e., cast film) as described by K. R. Osborn and W. A. Jenkins in "Plastic Films, Technology and Packaging Applications" (Technomic Publishing Co., Inc. (1992)), the disclosure of which is incorporated herein by reference, then the film must go through an additional post-extrusion step of adhesive or extrusion lamination to other packaging material layers to form a multilayer structure. If the film is a coextrusion of two or more layers (also described by Osborn and Jenkins), the film may still be laminated to additional layers of packaging materials, depending on the other physical requirements of the final film. "Laminations Vs. Coextrusion" by D. Dumbleton (Converting Magazine (September 1992)), the disclosure of which is incorporated herein by reference, also discusses lamination versus coextrusion. Monolayer and coextruded films can also go through other post extrusion techniques, such as a biaxial orientation process.

Extrusion coating is yet another technique for producing multilayer film structures. Such coatings comprise at least one layer of the film structure. Similar to cast film, extrusion coating is a flat die technique. A sealant can be extrusion coated onto a substrate either in the form of a monolayer or a coextruded extrudate.

Generally for a multilayer film structure, compositions made by the processes described herein comprise at least one layer of the total multilayer film structure. Other layers of the multilayer structure include but are not limited to barrier layers, and/or tie layers, and/or structural layers. Various materials can be used for these layers, with some of them being used as more than one layer in the same film structure. Some of these materials include: foil, nylon, ethylene/vinyl alcohol (EVOH) copolymers, polyvinylidene chloride (PVDC), polyethylene terephthalate (PET), oriented polypropylene (OPP), ethylene/vinyl acetate (EVA) copolymers, ethylene/acrylic acid (EAA) copolymers, ethylene/methacrylic acid (EMAA) copolymers, LLDPE, HDPE, LDPE, nylon, graft adhesive polymers (e.g., maleic anhydride grafted polyethylene), and paper. Generally, the multilayer film structures comprise from 2 to about 7 layers.

EXAMPLES

Example 1

Figure 2:
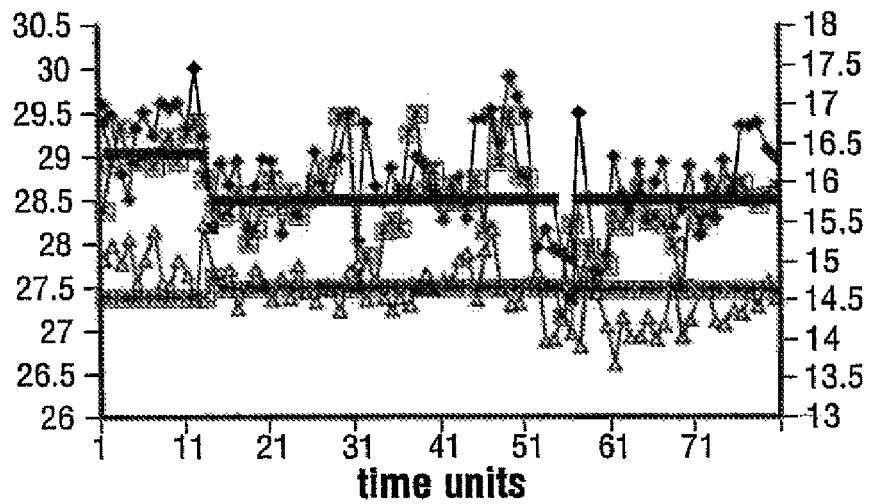
FIG. 2 illustrates the effect of the bed weight in an embodiment of the invention where the bed weight and a comonomer partial pressure manipulated to control the polymerization process.
Figure 3:
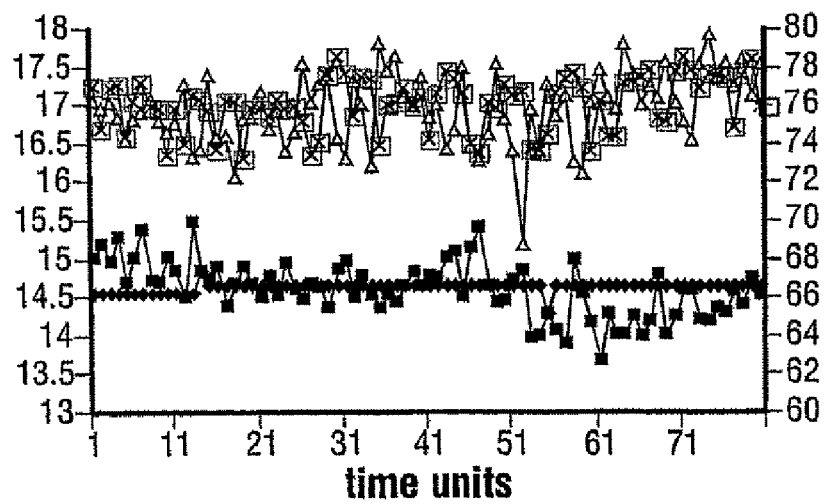
FIG. 3 illustrates the effect of the comonomer partial pressure in an embodiment of the invention where the bed weight and a comonomer partial pressure manipulated to control the polymerization process.

FIGS. 2 and 3 represent data generated by the procedure described in this example which is carried out in a gas phase fluidized bed reactor using a Ziegler-Natta catalyst. Ethylene partial pressure and reactor bed weight are controlled through predictive computer models and coordinated control methods. The reactor is operated continuously within the following ranges:

Total reactor pressure: 19.8 to 21.0 bar absolute (289 to 273 psig)

Reactor bed temperature: 69.9 to 71.5 degrees C.

The alpha-olefins are propylene and ethylene. The gas composition, by weight, is 25.2 to 26.7 percent ethylene; 42.4 to 44.4 percent propylene; 3.30 to 3.70 percent hydrogen; balance: nitrogen, ethane, methane, propane.

In this particular example, the ethylene partial pressure limit is set from a low of 4.0 bar absolute to a high of 8.0 bar absolute. The target reactor bed weight operating point is set to 13,000 kilograms. The reactor bed weight limit is selected to be at minus 500.0 kilograms to a plus 500.0 kilograms relative to the target reactor bed weight.

A desired resin production rate of 6,600 kilograms per hour is selected and is allowed to vary in a range from about 6,600 to about 6,660 kilograms per hour throughout the operating period as process conditions allow different production rates. The actual production rate is continuously measured and the difference between the actual production rate and desired production rate is determined.

From the difference between the actual and desired production rate, the ethylene partial pressure of the reactor is varied from 5.1 to 6.50 bar absolute over the entire operating period. When production rate falls below the rate desired, the ethylene partial pressure is increased, and when production rate rises above the rate desired, the ethylene partial pressure is decreased. All comparisons are based on predictive calculations. The ethylene partial pressure is maintained within the 4.0 to a high of 8.0 bar absolute limit established earlier. However, it is varied to allow the reactor bed weight to return to its predetermined target reactor bed weight operating point. In this example, the reactor bed weight varies, for periods of time, from the target value, but when ethylene partial pressure begins to have an effect on production rate, the ethylene partial pressure is moved back closer to the target. It does not always return exactly to the target reactor bed weight because of changing process conditions such as poisons or catalyst differences, but the trend to return to target is present.

Over the operating period the reactor bed weight is on average approximately 30 kilograms less than the approximate average target reactor bed weight. This is well within the limited range of minus 500.0 to plus 500.0 kilograms around the target reactor bed weight which indicates the reactor bed weight is kept near its target value for desired reactor operation. If the reactor bed weight was the sole control variable for production rate, variation of reactor bed weight would be expected to be much higher. Some of the offset of the actual reactor bed weight compared to the target reactor bed weight is also traced to the accuracy of predicted reactor bed weight effect on production rate compared to its actual effect on production rate. From the difference between the actual and desired production rate and considering the effect of ethylene reactor bed weight, the reactor bed weight is varied from minus 500.0 kilograms to plus 500.0 kilograms relative to the target reactor bed weight kilograms over the entire operating period. Based on production predictive calculations, the reactor bed weight is increased when the production rate is above that desired, and the reactor bed weight is decreased when the production rate is below that desired. The reactor bed weight is maintained within the minus 500.0 kilograms to plus 500.0 kilograms limit relative to the target the reactor bed weight established in the first step.

The bed weight is controlled by adjusting the bed level or actual weight by adjusting the timing of product discharges to be faster or slower to meet the desired bed weight. The amount of ethylene need to maintain the ethylene partial pressure is determined. The ethylene is introduced (and controlled) into the reactor at needed flows to keep the reactor pressure and ethylene partial pressure near desired values.

The target reactor bed weight operating point is adjusted as indicated by product and process analysis. In this case, reactor pressure, catalyst productivity, and resin density influence the target reactor bed weight operating point.

Example 2

Figure 4:
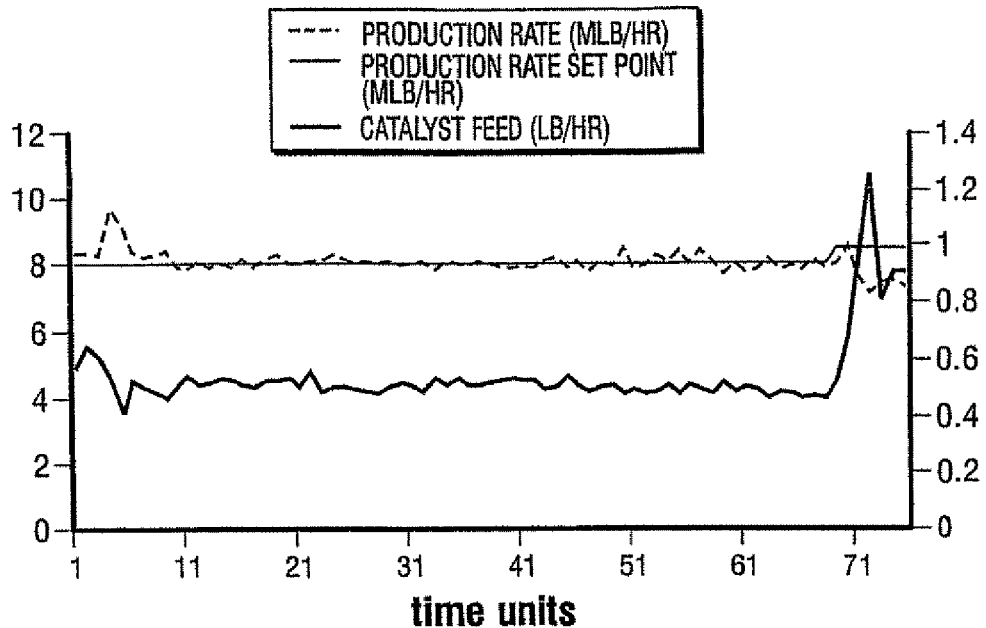
FIG. 4 illustrates the effect of the catalyst flow in an embodiment of the invention where the catalyst flow and a comonomer partial pressure manipulated to control a metallocene-based polymerization process.
Figure 5:
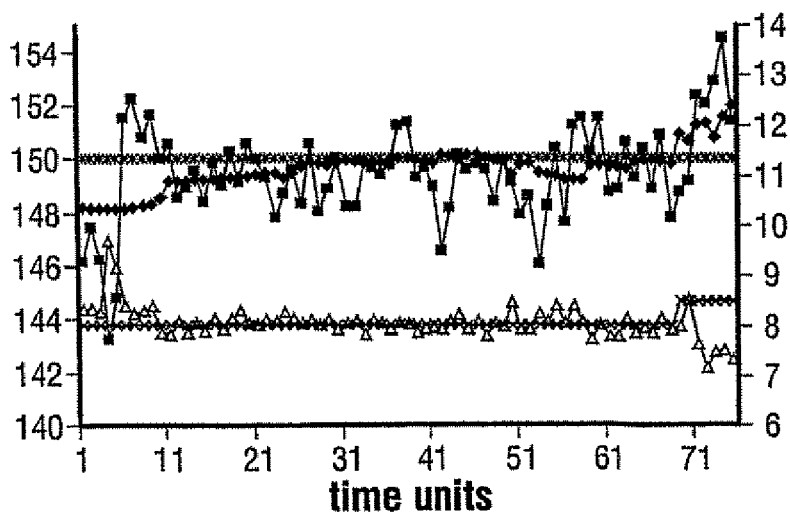
FIG. 5 illustrates the effect of the comonomer partial pressure in an embodiment of the invention where the catalyst flow and the comonomer partial pressure manipulated to control a metallocene-based polymerization process.

FIGS. 3 and 4 represent data generated by the procedure described in this example which is carried out in a gas phase fluidized bed reactor. A metallocene catalyst is used in the process. Catalyst flow rate and ethylene partial pressure are controlled through predictive computer models and coordinated control methods. The reactor is operated continuously within the following ranges:

Total reactor pressure: 16.8 to 18.2 bar absolute (245 to 265 psig)

Reactor bed temperature: 75.0 to 85.0 degrees C.

The alpha-olefins are ethylene, hexene, and hydrogen. The gas composition, by weight, is 58 to 52.5 percent ethylene; 0.68 to 73 percent hexene; 278.0 to 302.0 part per million hydrogen; balance: nitrogen, ethane, methane, propane. Example 2 steps:

The catalyst feed limit is set to a low of 2.8 kilogram per hour to a high of 3.5 kilogram per hour. The ethylene partial pressure limit is selected to be at minus 0.14 bar-absolute to a plus 0.14 bar-absolute relative to the target ethylene partial pressure. The target ethylene partial pressure operating point is set to 10.3 bar-absolute.

Initially, a desired resin production rate of 3,600 kilograms per hour is selected. The desired production rate is varied in a range from about 3,250 kilograms per hour to about 4,400 kilograms per hour throughout the operating period as process conditions allow different production rates.

The production rate is continuously measured. A difference between the actual and desired production rates is determined.

From the difference between the actual and desired production rate, catalyst feed is varied from 3.0 kilograms per hour to 3.3 kilograms per hour. When production rate falls below the rate desired, the catalyst feed is increased, and when production rate rises above the rate desired, the catalyst feed is decreased. All comparisons are based on predictive calculations. The catalyst feed is maintained within the low of 3.0 kilogram per hour to a high of 3.5 kilogram per hour limit established earlier. However, it is varied to allow the ethylene partial pressure to return to its predetermined target ethylene partial pressure operating point. In this example, the ethylene partial pressure varies, for periods of time, from the target value, but when ethylene partial pressure begins to have an effect on production rate, the ethylene partial pressure is moved back closer to the target. It does not always return exactly to the target ethylene partial pressure because of changing process conditions such as poisons or catalyst differences, but the trend to return to target is present.

Over the operating period the ethylene partial pressure is varied from about 10.14 bar absolute to about 10.41 bar absolute and is on average approximately 0.06 bar-absolute less than the approximate average target ethylene partial pressure. This is well within the limited range of minus 0.14 bar-absolute to a plus 0.14 bar-absolute around the target ethylene partial pressure which indicates the reactor bed weight is kept near its target value for desired reactor operation. If the ethylene partial pressure was the sole control variable for production rate, variation of ethylene partial pressure would be expected to be much higher. Some of the offset of the actual ethylene partial pressure compared to the target ethylene partial pressure is also traced to the accuracy of predicted ethylene partial pressure effect on production rate compared to its actual effect on production rate. The ethylene partial pressure is roughly maintained near the minus 0.14 bar-absolute to a plus 0.14 bar-absolute limit relative to the target ethylene partial pressure established in the first step.

The amount of ethylene needed to maintain the ethylene partial pressure is determined. The ethylene is introduced (and controlled) into the reactor at flows between 3,200 and 4,200 kilograms per hour to keep the reactor pressure and ethylene partial pressure near desired values and to satisfy the previous steps.

The target ethylene partial pressure operating point is adjusted as indicated by product and process analysis. In this case, reactor pressure and catalyst productivity influence the target ethylene partial pressure operating point.

While the invention has been described with respect to a limited number of embodiments, the specific features of one embodiment should not be attributed to other embodiments of the invention. No single embodiment is representative of all aspects of the inventions. Moreover, variations and modifications therefrom exist. For example, the processes described herein may comprise other steps or may lack any particular step not expressly enumerated herein. Some embodiments of the processes described herein consist of or consist essentially of the enumerated process steps. The appended claims intend to cover all such variations and modifications as falling within the scope of the invention. In at least some embodiments, variation in resin properties or production rate may be decreased by the methods described herein. Because of the decrease in variation, the likelihood of surges with the concomitant production interruption and degradation of resin properties is reduced and production rate can be increased. In addition, production rate and resin properties can be kept closer to desired values.

What is claimed is:

1. A method of controlling a gas-phase polymerization process, comprising:

(a) continuously, periodically or intermittently determining a difference between an actual or estimated value of a control variable and a desired value of the control variable;

(b) adjusting or maintaining at least a first manipulated variable to at least partially compensate for the difference between the actual or estimated value of control variable and the desired value; and (c) adjusting or maintaining a second manipulated variable to at least partially compensate for the effect of adjusting or maintaining the first manipulated variable;

wherein the first and second manipulated variables are selected from the group of process conditions consisting of a weight of fluidized bed, a concentration of one or more monomers, a flow of one or more comonomers, a ratio of a first comonomer to a second comonomer, an first activator concentration, a ratio of a second activator to selectivity control agent, a concentration of a chain transfer agent, and a retardant concentration.

2. A method of controlling a control variable of a polymerization reactor independent of controlling other polymerization conditions in a gas-phase polymerization process, comprising:

(a) continuously, periodically or intermittently determining a difference between an actual or estimated value of the control variable and a desired value of the control variable;

(b) adjusting or maintaining at least a first manipulated variable to at least partially compensate for the difference between the actual or estimated value of the control variable and the desired value; and (c) adjusting or maintaining a second manipulated variable to at least partially compensate for the effect of adjusting or maintaining the first manipulated variable;

wherein the first and second manipulated variables are selected from the group of process conditions consisting of a weight of fluidized bed, a concentration of one or more monomers, a flow of one or more comonomers, a ratio of a first comonomer to a second comonomer, an first activator concentration, a ratio of a second activator to selectivity control agent, a concentration of a chain transfer agent, and a retardant concentration.

3. The method of claim 1 wherein compensating for the effect of adjusting the first manipulated variable further includes compensating for at least a portion of a remaining difference between the actual or estimated value of the control variable and the desired value.

4. The method of claim 1, further including establishing limits on the value of the first manipulated variable.

5. The method of claim 1, wherein adjusting the second manipulated variable includes continuously, periodically, or intermittently adjusting or maintaining the second manipulated variable within a range having an upper and a lower limit bounding a target value for second manipulated variable.

6. The method of claim 5, wherein the absolute value of the difference between the upper limit and the target value is different than the absolute value between the lower limit and the target value.

7. The method of claim 5, wherein the target value of the second manipulated variable is continuously, intermittently, or periodically adjusted.

8. The method of claim 1, wherein a change in the second manipulated variable affects the control variable relatively faster than a change in the first manipulated variable.

9. The method of claim 1, wherein the second manipulated variable is selected from the group consisting of the weight of fluidized bed, the activator concentration, and the retardant concentration.

10. The method of claim 1 wherein the control variable is the production rate of the reactor.

11. The method of claim 1 wherein the control variable is a resin property selected from the group consisting of the molecular weight, the melt index, or molecular weight distribution of the resin.

12. The method of claim 1 where the polymerization process includes a single site catalyst.

13. The method according to claim 1, wherein the first or second manipulated variable is the fluidized bed weight.

14. The method according to any one of the preceding claims, wherein the first and second manipulated variables are selected from the activator concentration and the fluidized bed weight.

15. The method according to claim 1, wherein the first and second manipulated variables are selected from the concentration of one or more monomers and the fluidized bed weight.

16. The method according to claim 1, wherein the first and second manipulated variables are selected from the fluidized bed weight and the retardant concentration.

17. The method according to claim 1, wherein the bed weight is maintained within about 5% of a target bed weight.

18. The method according to claim 1, wherein the process forms an alpha-olefin homopolymer or interpolymer.

19. The method according to claim 18, wherein the alpha-olefin homopolymer or interpolymer comprises a polyethylene homopolymer or an interpolymer of ethylene with at least one comonomer selected from the group consisting of a $C_4$-$C_{20}$ linear, branched or cyclic diene, vinyl acetate, and a compound represented by the formula $H_2C=CHR$ wherein R is a $C_1$-$C_{20}$ linear, branched or cyclic alkyl group or a $C_6$-$C_{20}$ aryl group.

20. The method according to claim 18, wherein the alpha-olefin homopolymer or interpolymer comprises a polypropylene homopolymer or an interpolymer of propylene with at least one comonomer selected from the group consisting of ethylene, a $C_4$-$C_{20}$ linear, branched or cyclic diene, and a compound represented by the formula $H_2C=CHR$ wherein R is a $C_1$-$C_{20}$ linear, branched or cyclic alkyl group or a $C_6$-$C_{20}$ aryl group.

* * * * *